(12) United States Patent
Liu

(10) Patent No.: US 8,018,399 B2
(45) Date of Patent: Sep. 13, 2011

(54) PIXEL ARRAY

(75) Inventor: Chih-Chung Liu, Guangdong (CN)

(73) Assignee: Century Display(ShenZhen) Co., Ltd., Longhua, Baoan, Shen-zhen, Guangdong (*) Notice: Subject to any disclaimer, the term of this patent is extended or adjusted under 35 U.S.C. 154(b) by 0 days.

(21) Appl. No.: 12/868,710

(22) Filed: Aug. 25, 2010

(65) Prior Publication Data
US 2011/0115691 A1    May 19, 2011

Related U.S. Application Data

(63) Continuation of application No. PCT/CN2009/075749, filed on Dec. 21, 2009.

(30) Foreign Application Priority Data

Nov. 18, 2009   (CN) .......................... 2009 1 0224497

(51) Int. Cl.
  G09G 3/20   (2006.01)
  G09G 3/36   (2006.01)
(52) U.S. Cl. ............................. 345/55; 345/90; 345/103
(58) Field of Classification Search .................. None
  See application file for complete search history.

(56) References Cited

U.S. PATENT DOCUMENTS

| 5,144,288 | A  | * | 9/1992  | Hamada et al. ............... 349/109 |
| 6,075,505 | A  | * | 6/2000  | Shiba et al. ...................... 345/87 |
| 6,583,777 | B2 |   | 6/2003  | Hebiguchi |
| 6,621,102 | B2 | * | 9/2003  | Hirakata et al. ................ 257/72 |
| 6,940,476 | B2 | * | 9/2005  | Ko .................................. 345/76 |
| 7,230,592 | B2 | * | 6/2007  | Sato et al. ....................... 345/76 |
| 7,355,576 | B2 | * | 4/2008  | Song .............................. 345/87 |
| 7,420,642 | B2 | * | 9/2008  | Lee ............................... 349/141 |
| 7,605,885 | B2 | * | 10/2009 | Ina et al. ........................ 349/106 |
| 7,667,674 | B2 | * | 2/2010  | Sato et al. ...................... 345/76 |
| 2001/0011981 | A1 | * | 8/2001 | Yamamoto et al. .......... 345/87 |
| 2002/0067322 | A1 | * | 6/2002 | Yanagawa et al. ............ 345/87 |
| 2007/0200805 | A1 | * | 8/2007 | Sato et al. ...................... 345/76 |
| 2009/0027320 | A1 | * | 1/2009 | Lai et al. ........................ 345/87 |
| 2010/0053058 | A1 | * | 3/2010 | Nagashima et al. ........... 345/98 |

\* cited by examiner

*Primary Examiner* — Richard Hjerpe
*Assistant Examiner* — Alecia D English
(74) *Attorney, Agent, or Firm* — Winston Hsu; Scott Margo (57) ABSTRACT

A pixel array includes scan lines extended along a row direction in a zigzag manner, data lines extended along a column direction, and pixels connected the scan lines and the data lines. Each pixel arranged in $n^{th}$ row includes a first sub-pixel and a second sub-pixel. The first sub-pixel includes a first transistor and a first pixel electrode. A first gate electrode and a first drain electrode of the first transistor are respectively connected to the $(n+1)^{th}$ scan line and the first pixel electrode. A second sub-pixel includes a second transistor and a second pixel electrode. A second gate electrode and a second drain electrode of the second transistor are respectively connected to the $n^{th}$ scan line and the second sub-pixel electrode. A first source electrode of the first transistor and a second source electrode of the second transistor are connected to the same data line.

17 Claims, 12 Drawing Sheets

PIXEL ARRAY

CROSS REFERENCE TO RELATED APPLICATIONS

This application is a continuation of International Application No. PCT/CN2009/075749 filed on Dec. 21, 2009.

BACKGROUND OF THE INVENTION

1. Field of the Invention

The present invention relates to a display array, and more particularly to a pixel array.

2. Description of the Prior Art

Generally, a flat display device primarily includes a display panel and a plurality of driver ICs. The display panel includes a pixel array, and the pixels of the pixel array are driven by corresponding scan lines and corresponding data lines. In order to popularize the flat display device, industries have spent a great amount of effort in reducing the manufacturing costs. In recent years, a new half source driver design layout was developed which reduces the number of data driver ICs required through primarily changing the layout of the pixel array.

Figure 1A:
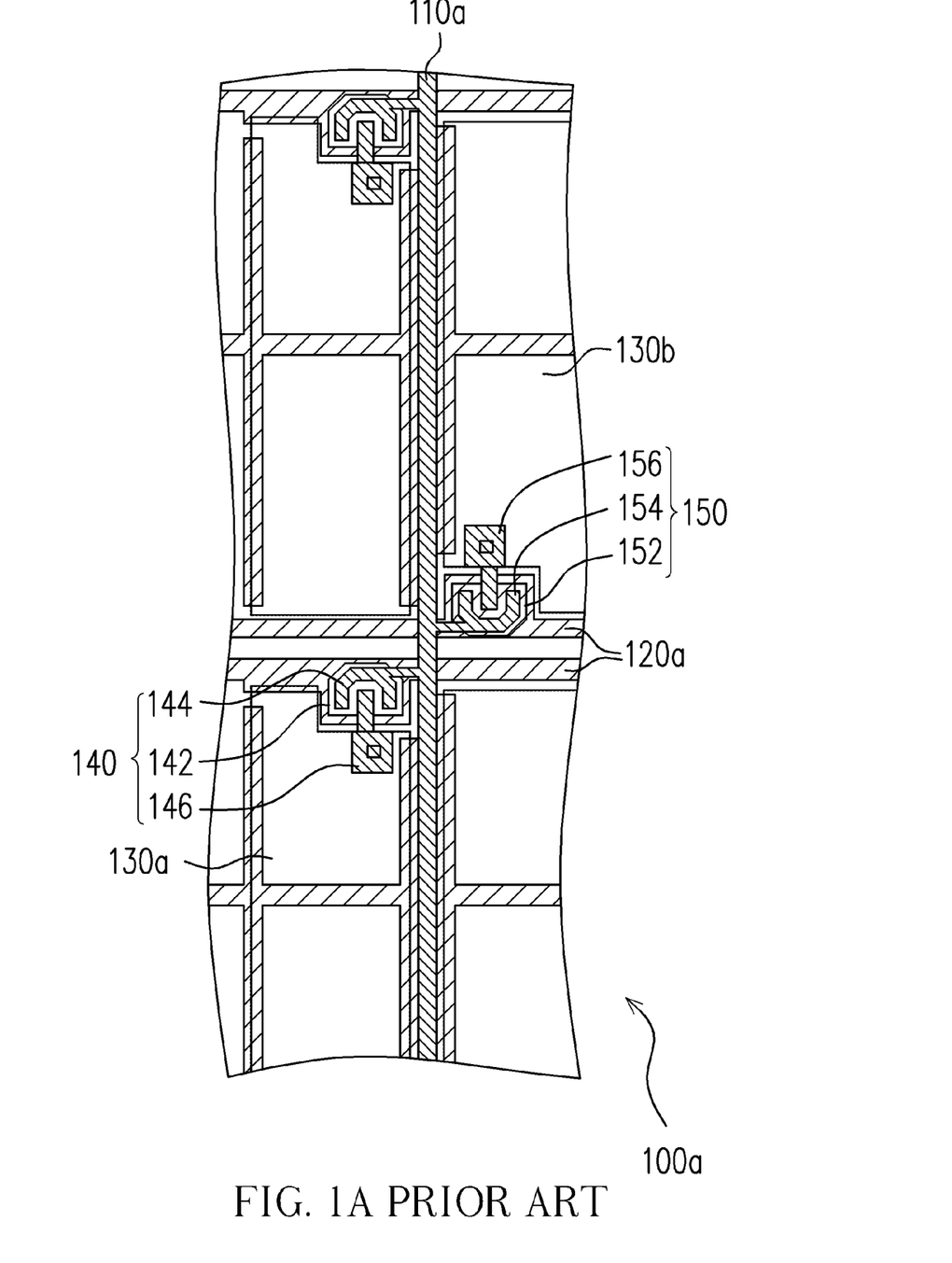
FIG. 1A is a schematic diagram of a conventional pixel array.

FIG. 1A is a schematic diagram of a conventional pixel array. Referring to FIG. 1A, in the design of the conventional pixel array 100a, the two scan lines 120a are disposed between pixels 130a, 130b of two the adjacent rows, wherein the gate electrodes 142, 152 of the active components 140, 150 of the two pixels 130a, 130b are respectively disposed on two sides of the scan lines 120a. In the manufacturing process of the active component 140, 150, the gate electrodes 142, 152 of the active components 140, 150, and the source electrodes 144, 154 and the drain electrodes 146, 156 of the active components 140, 150 are manufactured though the use of different photo masks. For example, the gate electrodes 142, 152 of the active components 140, 150 come out of the first photo mask process and the source electrodes 144, 154 and the drain electrodes 146, 156 of the active components 140, 150 come out of the fourth photo mask process. These two processes should be aligned with precise accuracy, and if the photo mask machine is misaligned from the previous process, misalignment would occur between the gate electrodes 142, 152, the source electrodes 144, 154 and the drain electrodes 146, 156 of the active components 140, 150, forcing the characteristics of the active components 140, 150 to deviate from the original design purpose values. Meanwhile, since the gate electrodes 142, 152 correspond to the two sides of the scan lines 120 respectively, when the gate electrodes 142, 152 and the drain electrodes 146, 156 of the active components 140, 150 are misaligned, the areas where the gate electrodes 142, 152 and the drain electrodes 146, 156 of the active components 140, 150 of the pixels 130a, 130b overlap would vary in behaviors. If the deviation shifts towards the pixel 130b, a gate-drain parasitic capacitance Cgd of the pixel 130a on one side of the scan lines 120a will increase, while the gate-drain parasitic capacitance Cgd of the pixel 130b on the other side of the scan lines 120a will decrease, so that the gate-drain parasitic capacitances Cgd of the pixels 130a, 130b would be different. As a result, since the gate-drain parasitic capacitance Cgd differences induced by the process misalignment described above are significant, the color brightness disequilibrium uneven display brightness on the pixel array 100a during display would occur.

Figure 1B:
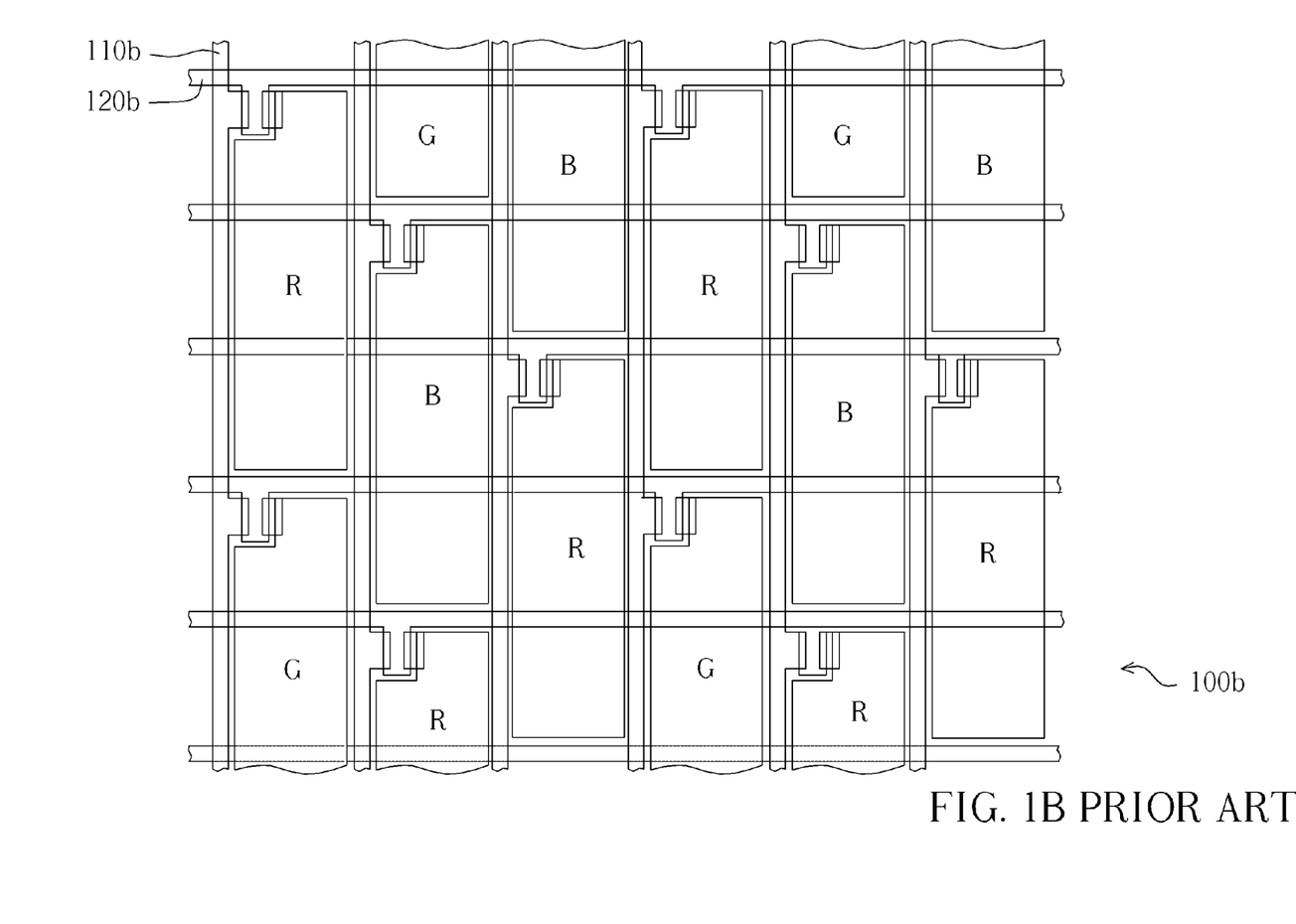
FIG. 1B is a schematic diagram of another conventional pixel array.

In order to minimize the difference of the gate-drain parasitic capacitance Cgd between the pixels, U.S. Pat. No. 6,583,777 provides a pixel array structure. Referring to FIG. 1B, a pixel array 100b includes a plurality of irregularly-arranged pixels R, G, B, and scan lines 110b and data lines 120b connected to the pixels R, G, B respectively. The scan line 110b extends linearly along a row direction, and the data line 120b extends linearly along a column direction. The data line 120 intersects with the scan lines 110b perpendicularly. However, since the pixels R, G, B are irregularly-arranged, the color performance during the display is usually insufficient. Furthermore, since each of the pixels R, G, B crosses three scan lines 110b, such pixel array design would decrease the aperture ratio, resulting in insufficient brightness during the display and poor display quality.

SUMMARY OF THE INVENTION

The present invention provides a pixel array which lessens the gate-drain parasitic capacitance difference and improves the display quality.

The present invention provides a pixel array including a plurality of scan lines, a plurality of data lines and a plurality of pixels. The scan lines extend along a row direction in a zigzag manner. The data lines extend along a column direction and intersect with the scan lines. The pixels are connected to the scan lines and the data lines. Each of the pixels aligned in the $n^{th}$ row includes a first sub-pixel and a second sub-pixel. The first sub-pixel includes a first transistor and a first pixel electrode, wherein a first gate electrode of the first transistor is connected to the $(n+1)^{th}$ scan line and a first drain electrode of the first transistor is connected to the first pixel electrode. The second sub-pixel includes a second transistor and a second pixel electrode, wherein a second gate electrode of the second transistor is connected to the $n^{th}$ scan line, a second drain electrode of the second transistor is connected to the second pixel electrode, and a first source electrode of the first transistor and a second source electrode of the second transistor are connected to the same data line of the data lines.

According to an embodiment of the present invention, a layout pattern of the first transistor and the second transistor have an upward protrusive pattern with respect to the corresponding scan line.

According to an embodiment of the present invention, a layout pattern of the first transistor and the second transistor have a downward protrusive pattern with respect to the corresponding scan line.

According to an embodiment of the present invention, the first transistors and the second transistors in the pixels aligned in a same row are disposed on a same side of the row of the pixels.

According to an embodiment of the present invention, three sides of each of the first pixel electrodes or each of the second pixel electrodes are surrounded by the corresponding scan line.

According to an embodiment of the present invention, each of the scan lines is a square shaped wave pattern on the pixel array.

According to an embodiment of the present invention, each of the scan lines comprises a plurality of first conductive wires and a plurality of second conductive wires. The first conductive wires extend along a row direction. The second conductive wires extend along a column direction. The first conductive wires and the second conductive wires are alternately connected.

According to an embodiment of the present invention, a portion of the second conductive wires is covered by either the first pixel electrode or the second pixel electrode.

According to an embodiment of the present invention, the second conductive wires are disposed between the first sub-pixel and the second sub-pixel in a same pixel, and are disposed between two adjacent pixels.

According to an embodiment of the present invention, a length of each of the first conductive wires is substantially longer than or equal to a width of one of the pixel electrodes, and a length of each of the second conductive wires is substantially longer than or equal to a length of one of the pixel electrodes.

According to an embodiment of the present invention, each of the scan lines further comprises a plurality of first branches and a plurality of second branches. The first branches are connected to a portion of the first conductive wires and extend along a column direction. The second branches are connected to a portion of the first conductive wires and extend along a column direction. The first branches and the second branches are substantially parallel to the second conductive wires.

According to an embodiment of the present invention, a portion of the first branches and a portion of the second branches in a same pixel are covered by the second pixel electrode.

According to an embodiment of the present invention, the pixels connected to a same data line are arranged on two sides of the data line.

According to an embodiment of the present invention, in the pixels aligned in a same row, a portion of the pixels in even number columns are connected to a same scan line, and a portion of the pixels in odd number columns are connected to another scan line.

According to an embodiment of the present invention, in each of the pixels aligned in the $n^{th}$ row, the first transistor and the second transistor comprise a first channel layer and a second channel layer respectively, the first channel layer is disposed above the $(n+1)^{th}$ scan line, and the second channel layer is disposed above the $n^{th}$ scan line. The first drain electrode is connected to the first pixel electrode from the first channel layer along a first direction, the second drain electrode is connected to the second pixel electrode from the second channel layer along a second direction, and the first direction is the same as the second direction.

According to an embodiment of the present invention, in the pixels aligned in a same row, a connection line connecting a center point of the first sub-pixel and a center point of the second sub-pixel is substantially a straight line.

According to an embodiment of the present invention, in each of the pixels, a shape of the first transistor is a mirror image of a shape of the second transistor with respect to the data lines.

According to an embodiment of the present invention, the first sub-pixel further comprises a first capacitor electrode electrically connected to the first pixel electrode, and the first capacitor electrode partially overlaps the previous scan line to form a first storage capacitor. The second sub-pixel further comprises a second capacitor electrode electrically connected to the second pixel electrode, and the second capacitor electrode partially overlaps the previous scan line to form a second storage capacitor.

In summary, the pixel array in accordance with the present invention is designed to arrange the scan lines in a zigzag manner, while the first sub-pixel and the second sub-pixel connected to the same data line are disposed on the two sides of the data line. Meanwhile, the first gate electrode of the first transistor in the same pixel is connected to the $(n+1)^{th}$ scan line, and the gate electrode of the second transistor is connected to the $n^{th}$ scan line. Therefore, the pixel array design in accordance with the present invention not only greatly reduces the amount of data lines in the layout and decreases the manufacturing cost, but also increases the aperture ratio so that the brightness of the display and the color performance are significantly improved. In addition, since the extending direction of the drain electrodes of the transistors toward the corresponding pixel electrodes are all the same, the overall gate-drain parasitic capacitance (Cgd) difference caused by the misalignments between the films of the transistors during the manufacturing process is minimized. As a result, when the pixel array in accordance with the present invention is applied to a display device, the brightness uniformity of the display device is improved. Consequently, the issue of uneven brightness caused by the flicker effect can be avoided.

These and other objectives of the present invention will no doubt become obvious to those of ordinary skill in the art after reading the following detailed description of the preferred embodiment that is illustrated in the various figures and drawings.

DETAILED DESCRIPTION

Figure 2A:
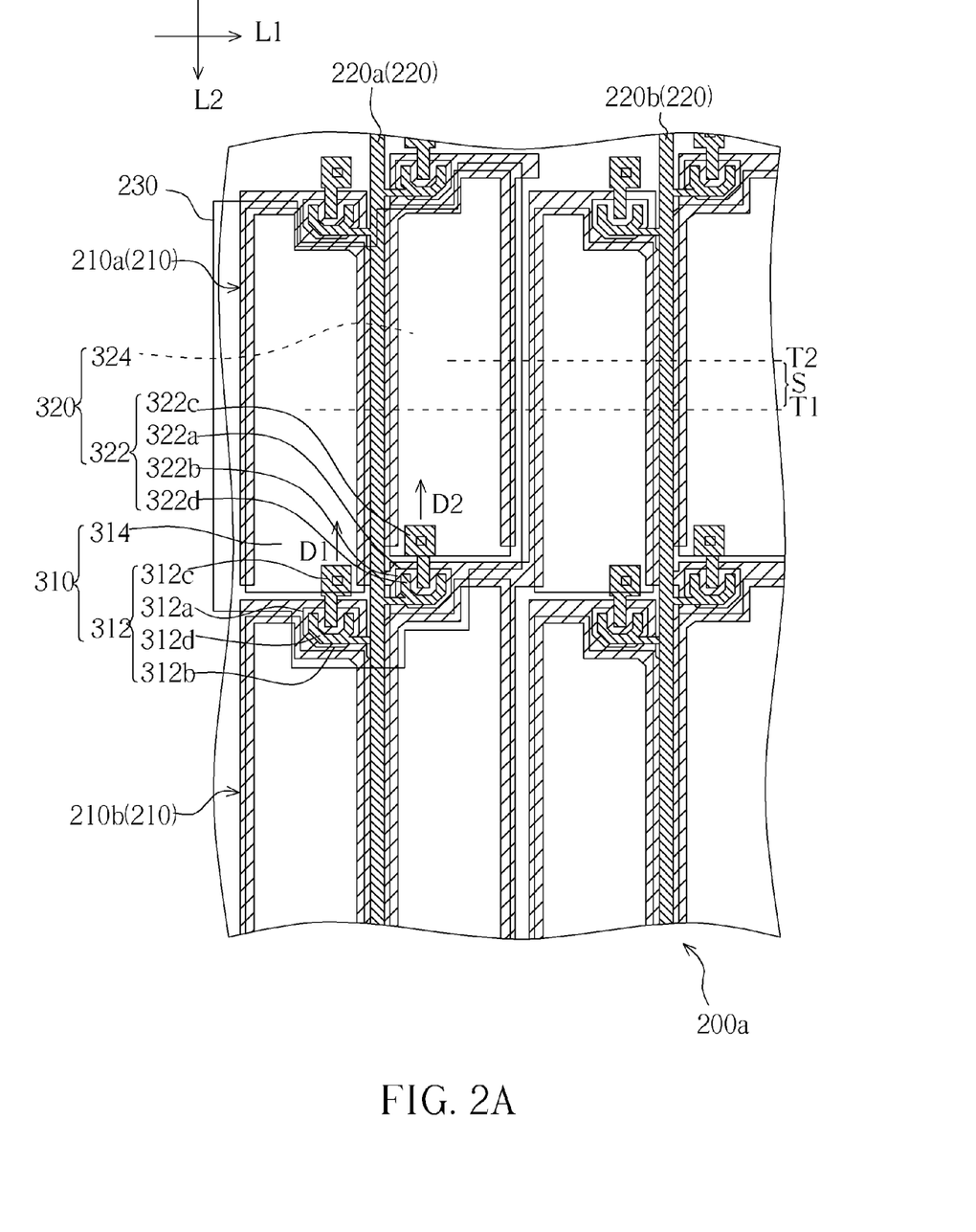
FIG. 2A is a schematic diagram illustrating a pixel array in accordance with an embodiment of the present invention.
Figure 2B:
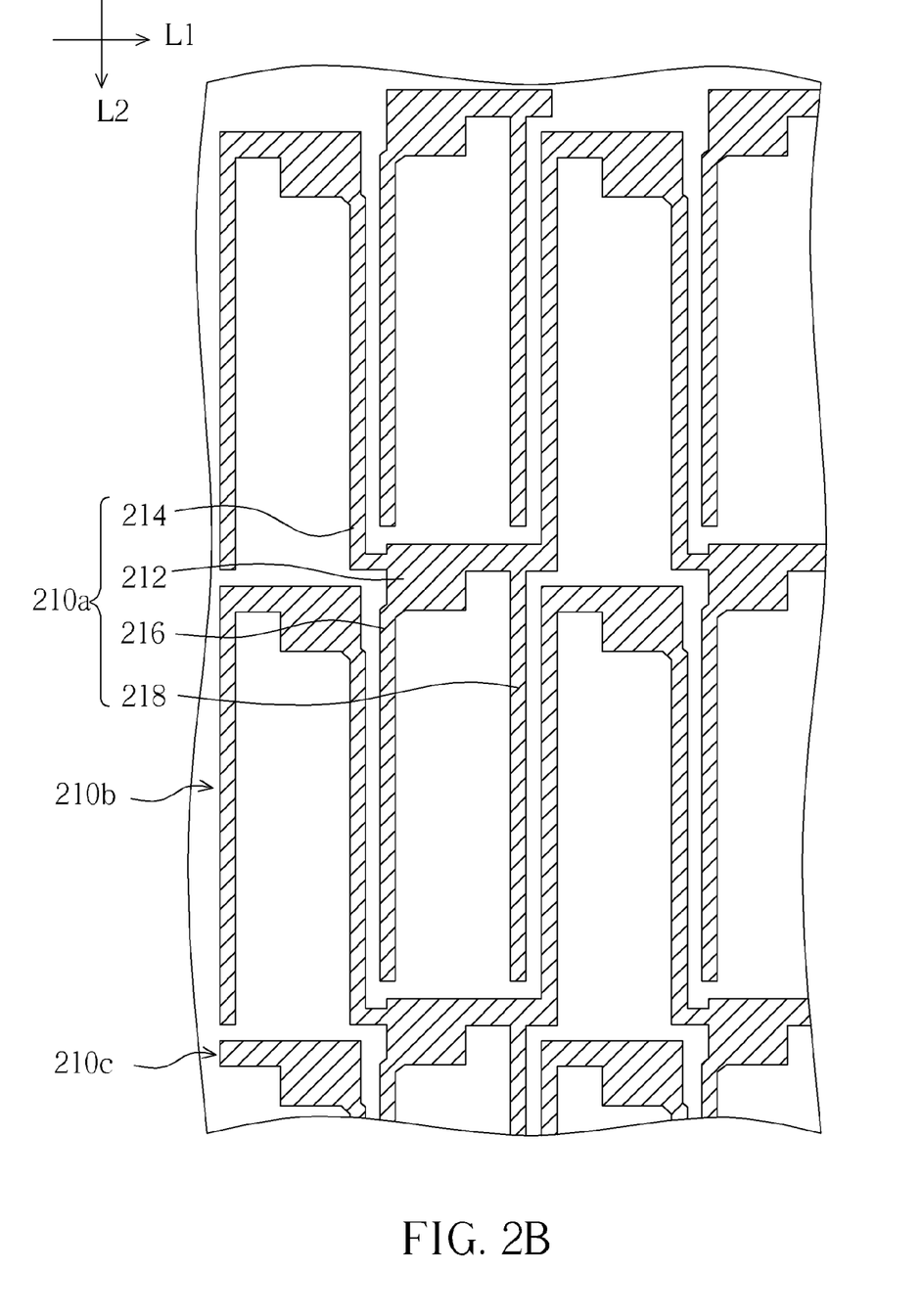
FIG. 2B is a schematic diagram illustrating scan lines of the pixel array of FIG. 2A.
Figure 4:
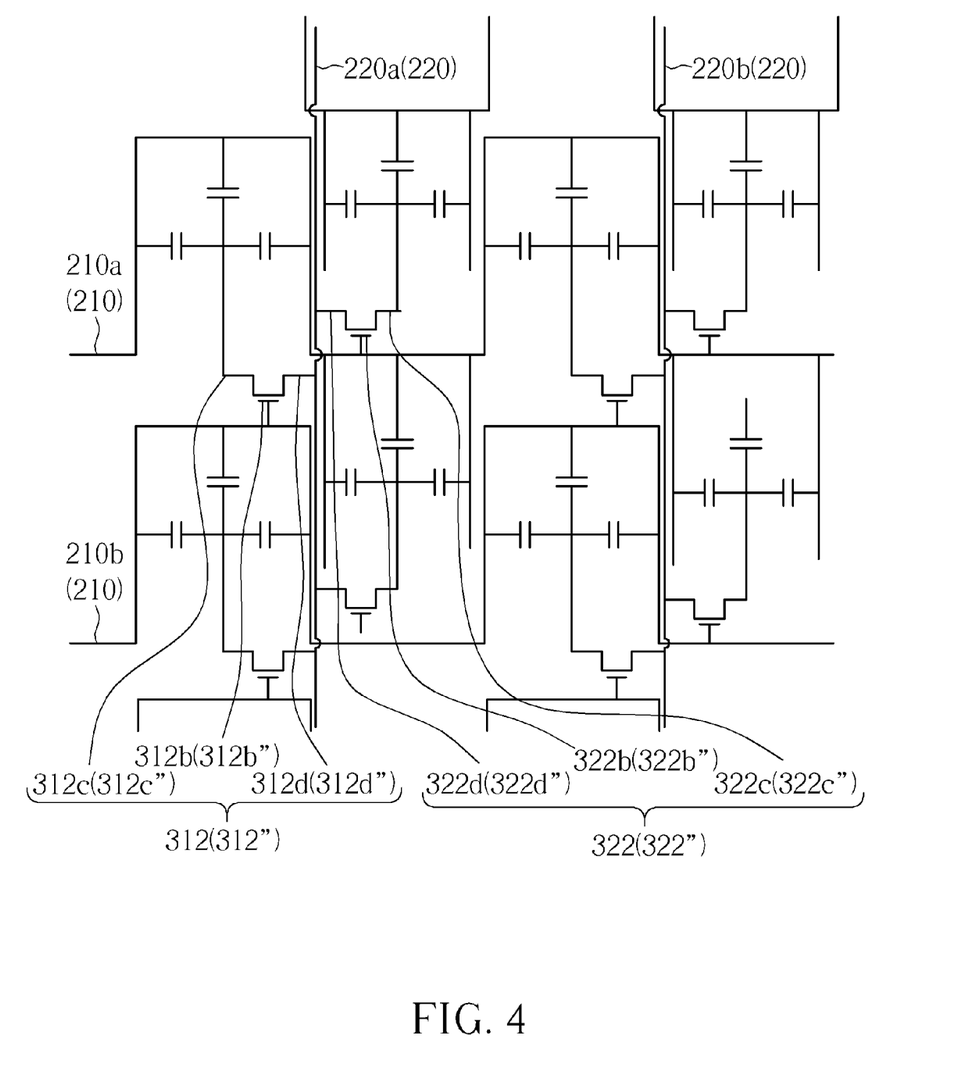
FIG. 4 is a circuit diagram of pixel arrays of FIG. 2A and FIG. 3A.

FIG. 2A is a schematic diagram illustrating a pixel array in accordance with an embodiment of the present invention. FIG. 2B is a schematic diagram illustrating scan lines of the pixel array of FIG. 2A. FIG. 4 is a circuit diagram of pixel arrays of FIGS. 2A and 3A. Referring to FIG. 2A, FIG. 2B and FIG. 4, a pixel array 200a in accordance with the present embodiment includes a plurality of scan lines 210, a plurality of data lines 220 and a plurality of pixels 230. For the ease of explanation, the pixel array 200a includes a row direction L1 and a column direction L2, and the row direction L1 substantially orthogonally intersects the column direction L2.

As illustrated in FIG. 2B, the scan lines 210 in accordance with the present embodiment substantially extends along the row direction L1 in a zigzag manner. To simplify the description, the following would consider the scan lines 210 as formed by a plurality of first scan lines 210a and a plurality of second scan lines 210b. In other words, the scan lines 210 in macro view are parallel to one another and extend along the row direction L1, and the scan lines 210 in micro view substantially exhibit a square shaped wave pattern and extend in a zigzag manner on a substrate.

To be more exact, each of the first scan lines 210a (or each of the second scan lines 210b) in accordance with the present embodiment includes a plurality of first conductive wires 212, a plurality of second conductive wires 214, a plurality of first branches 216 and a plurality of second branches 218. The first conductive wires 212 substantially extend along the row direction L1, and the second conductive wires 214 substantially extend along the column direction L2. It is to be noted that, the first conductive wires 212 and the second conductive wires 214 are alternately connected, so that the first scan line 210a substantially exhibits a square shaped wave pattern. In other embodiments, the first scan line 210a may also exhibit a saw tooth pattern or an "S" shaped pattern. The first branches 216 are connected to a portion of the first conductive wires 212 and substantially extend along the column direction L2. The second branches 218 are connected to a portion of the first conductive wires 212 and substantially extend along the column direction L2. The first branches 216 and the second branches 218 are substantially parallel to the second conductive wires 214, and each of the first conductive wires 212 of the first scan line 210a near the second scan line 210b is connected to a first branch 216 and a second branch 218, so that the first branches 216 of the first scan line 210a and the second conductive wires 214 of the second scan line 210b are substantially disposed on the two sides of the data line. Therefore lateral light leakage of each of the sub-pixels near the data lines can further be avoided by virtue of the disposition of the first branches 216 and the second branches 218.

Again referring to FIG. 2A, FIG. 2B and FIG. 4, the data lines 220 in accordance with the present embodiment substantially extend in the column direction L2 and intersect the first scan lines 210a and the second scan lines 210b to form a plurality of pixel regions. The data lines 220 in accordance with the present embodiment intersect the first scan lines 210a and the second scan lines 210b, but the data lines 220 are not electrically connected to the first scan lines 210a and the second scan lines 210b. Each of the pixels 230 of the pixel array 200a is connected to the corresponding first scan line 210a, second scan line 210b and data line 220, and each of the pixels 230 aligned in the $n^{th}$ row includes a first sub-pixel 310 and a second sub-pixel 320. The first sub-pixel 310 includes a first transistor 312 and a first pixel electrode 314, wherein the first transistor 312 includes a first channel layer 312a, a first gate electrode 312b, a first drain electrode 312c and a first source electrode 312d. The first channel layer 312a is disposed on the $(n+1)^{th}$ scan line 210 (i.e. the second scan line 210b), and the first gate electrode 312b is connected to the $(n+1)^{th}$ scan line 210 (i.e. the second line 210b). The first drain electrode 312c is connected to the first pixel electrode 314, and the first drain electrode 312c extends from the first channel layer 312a along a first direction D1 to connect to the first pixel electrode 314. Three sides of the first pixel electrode 314 are surrounded by the first scan line 210a.

On the other hand, the second sub-pixel 320 includes a second transistor 322 and a second pixel electrode 324, wherein the second transistor 322 includes a second channel layer 322a, a second gate electrode 322b, a second drain electrode 322c and a second source electrode 322d. The second channel layer 322a is disposed on the $n^{th}$ scan line 210 (i.e. the first scan line 210a), and the second gate electrode 322b is connected to the $n^{th}$ scan line 210 (i.e. the first scan line 210a). The second drain electrode 322c is connected to the second pixel electrode 324, and the second drain electrode 322c extends from the second channel layer 322a along a second direction D2 to connect to the second pixel electrode 324. It is to be noted that the first direction D1 and the second direction D2 are the same. In other words, the first direction D1 and the second direction D2 are substantially parallel to each other. Three sides of the second pixel electrode 324 are surrounded by a corresponding scan line (not illustrated in the figure).

Figure 2C:
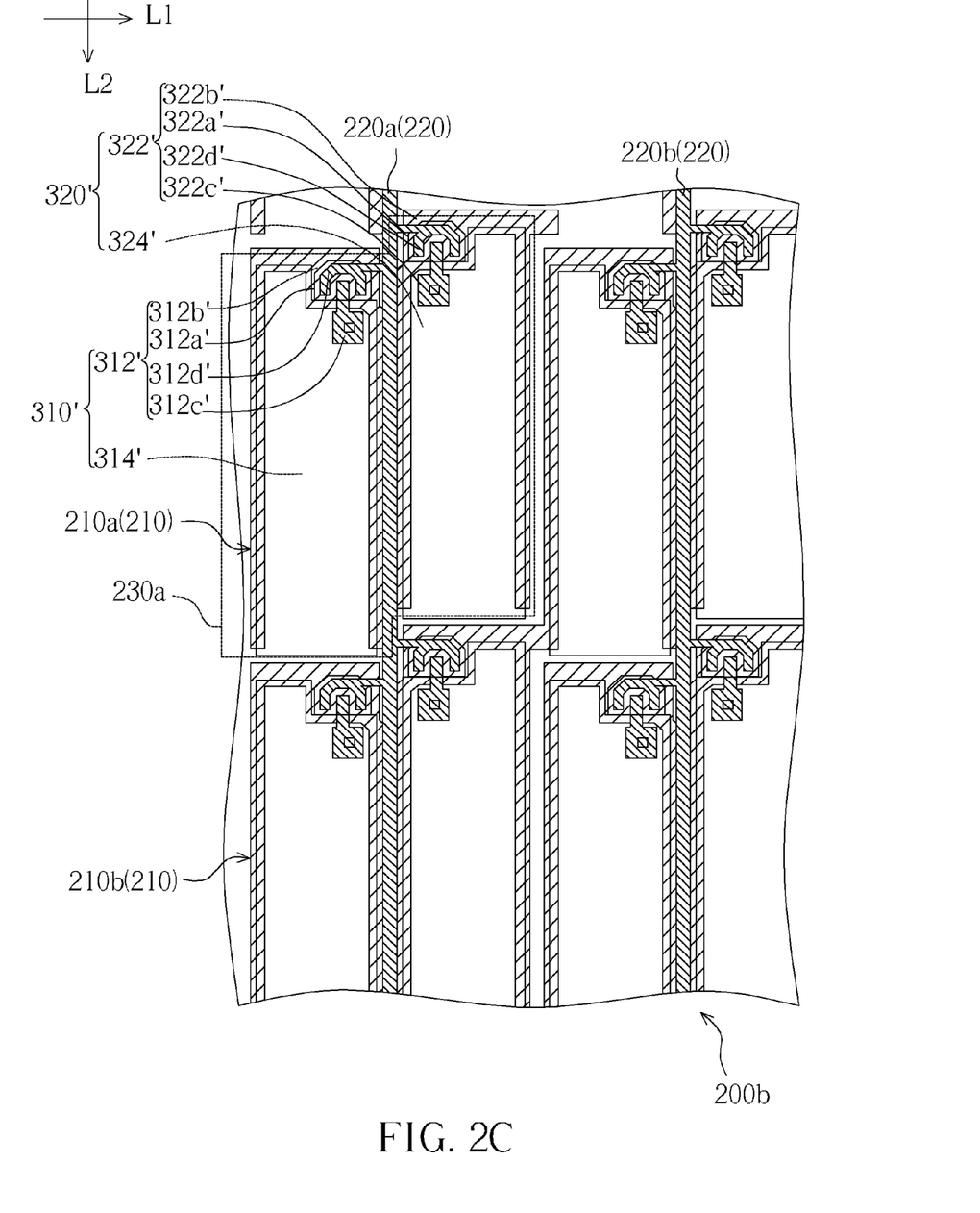
FIG. 2C is a schematic diagram illustrating a pixel array in accordance with another embodiment of the present invention.
Figure 2D:
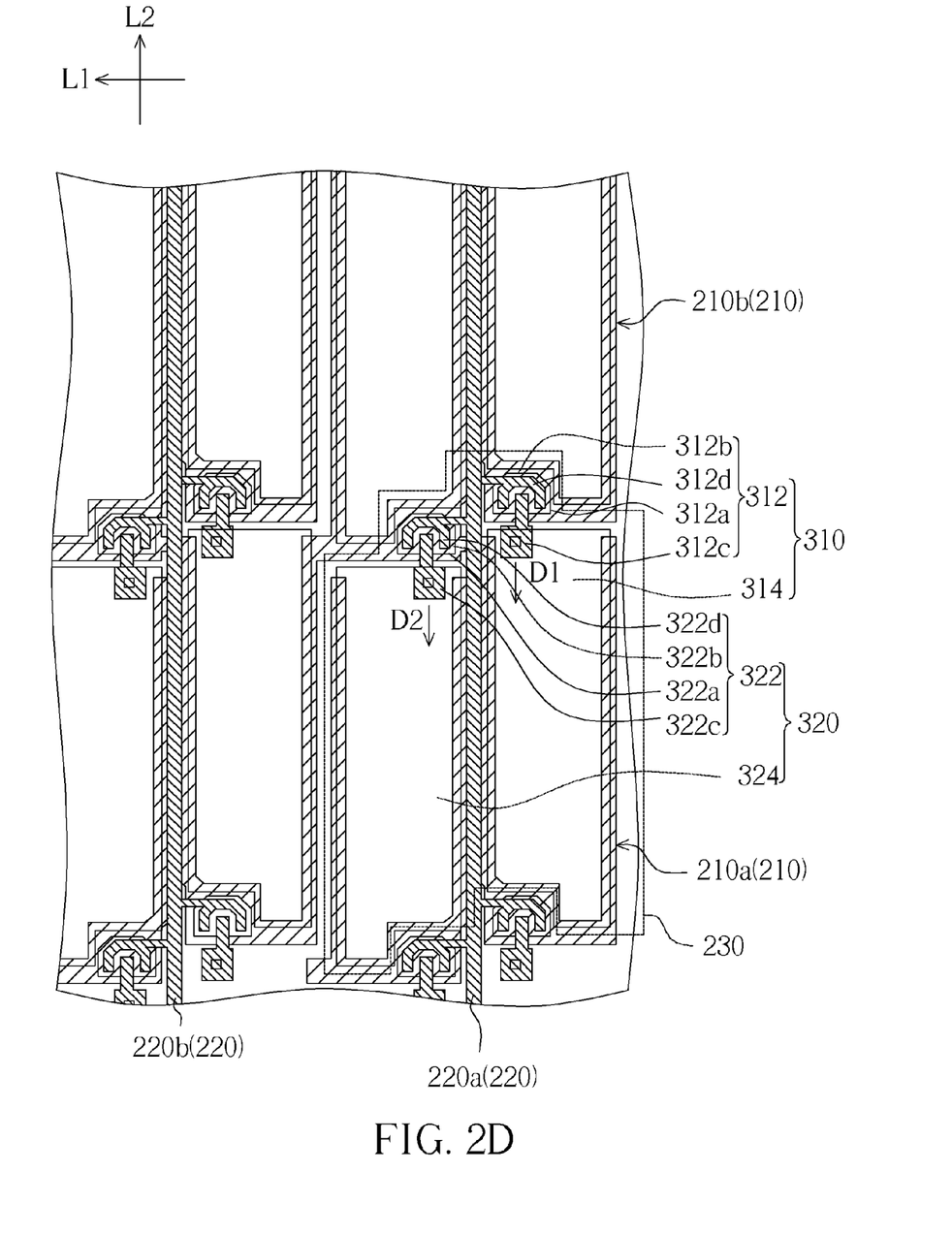
FIG. 2D is a schematic diagram illustrating a pixel array in accordance with another embodiment of the present invention.
Figure 5:
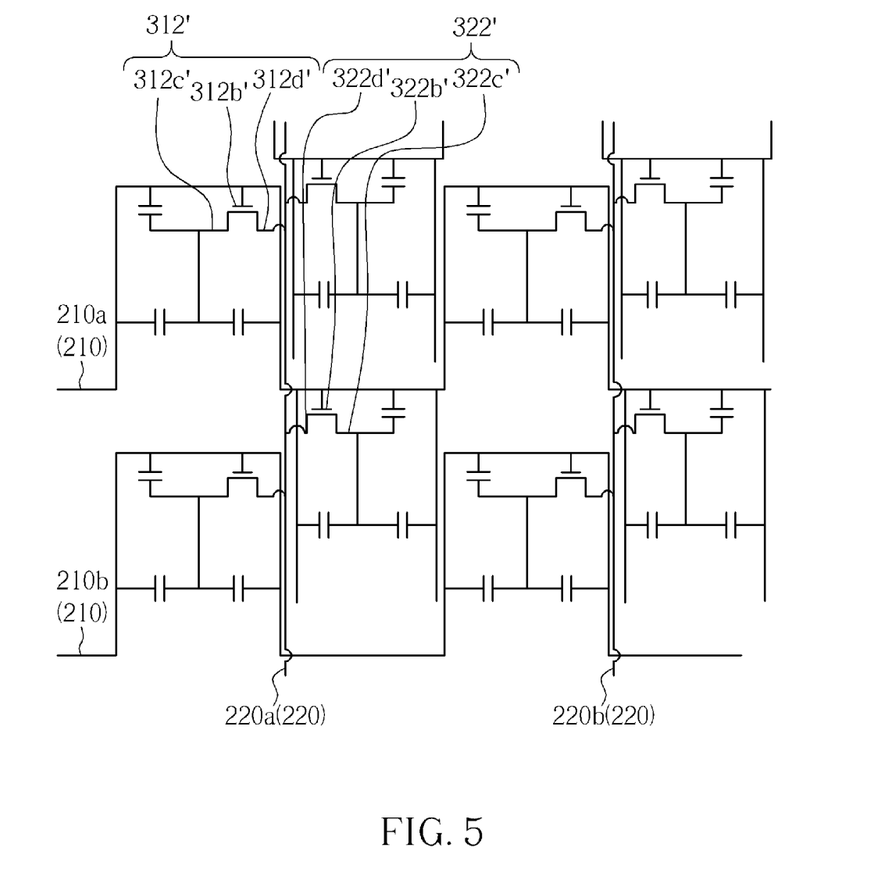
FIG. 5 is a circuit diagram of a pixel array of FIG. 2C.
Figure 6:
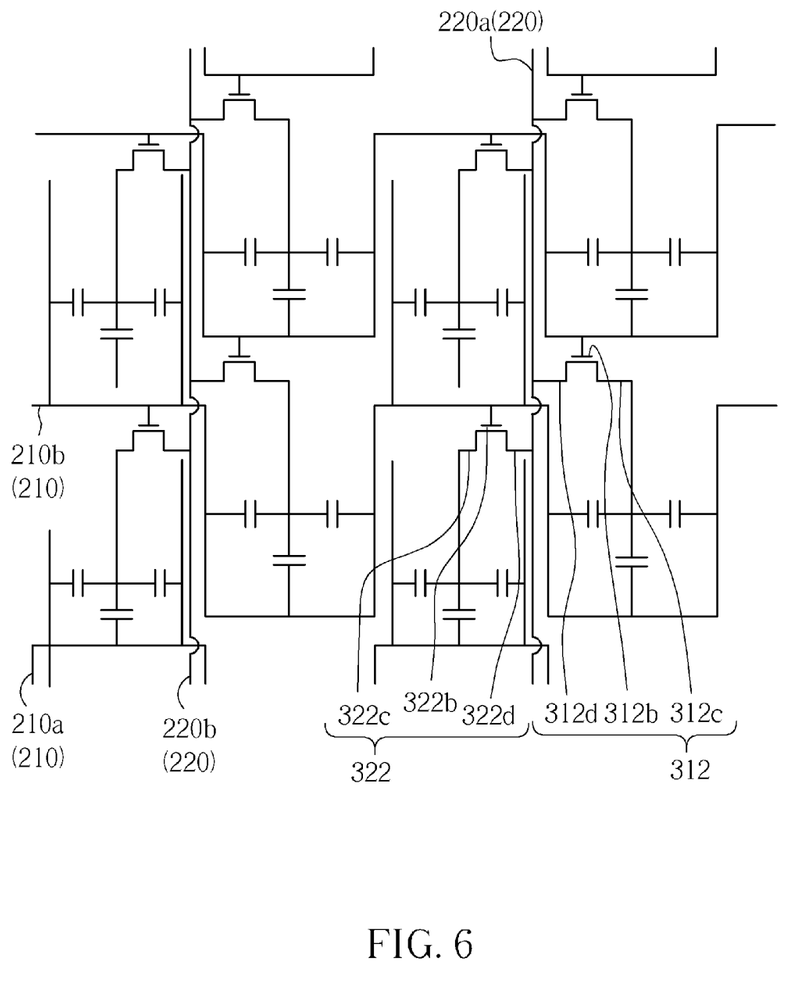
FIG. 6 is a circuit diagram of a pixel array of FIG. 2D.

To be exact, the layout patterns of the first transistor 312 and the second transistor 322 have an upward protrusive pattern with respect to the corresponding second scan line 210b and the first scan line 210a respectively. Therefore, in accordance with the present embodiment, the pixels of the $n^{th}$ row are disposed in a region surrounded the $n^{th}$ scan lines 210; as for the first sub-pixel 310 and the second sub-pixel 320 of the $n^{th}$ row, the first gate electrode 312b is connected to the $(n+1)^{th}$ scan lines 210 (i.e. the second scan line 210b, and the second gate electrode 322b is connected to the $n^{th}$ scan lines 210 (i.e. the first scan line 210a). In other words, the scan lines 210 connected to the first gate electrode 312b is next to the scan line 210 connected to the second gate electrode 322b. Since n can be any positive integer, it should be obvious to those of ordinary skill in the art to understand that the first gate electrode 312b is connected to the $n^{th}$ scan line 210, and the second gate electrode 322b is connected to the $(n-1)^{th}$ scan line 210, but the present invention is not limited thereto. In other embodiments, a layout pattern of a first transistor 312' and a layout pattern of a second transistor 322' in a pixel array 200b have downward protrusive patterns with respect to the corresponding second scan line 210b and the first scan line 210a respectively are illustrated in FIG. 2C, and a circuit diagram of the pixel array of FIG. 2C is illustrated in FIG. 5. In other words, the pixels in the $n^{th}$ row are disposed in a region surrounded by the $n^{th}$ scan line 210; for the pixels in the $n^{th}$ row, a first gate electrode 312b' is connected to the $n^{th}$ scan line 210 and a second gate electrode 322b' is connected to the $(n-1)^{th}$ scan line 210. In other words, the scan line 210 connected to the first gate electrode 312b' is next to the scan line 210 connected to the second gate electrode 322b'. Since n can be any positive integer, it should be obvious to those of ordinary skill in the art to understand that the first gate electrode 312b'' is connected to the $n^{th}$ scan line 210, and the second gate electrode 322b' is connected to the $(n+1)^{th}$ scan line 210, but the present invention is not limited thereto. In addition, it should be obvious to those of ordinary skill in the art to understand that the directional descriptions such as up, down, front, back, left, right, and etc. are used to refer to the directions of the attached figures only. Therefore, the directional descriptions are for descriptions, and do not limit the present invention. In other words, if FIG. 2A is reversed by 180 degrees, the layout patterns for the first transistor 312 and the second transistor 322 would be a downward protrusive shape with respect to the corresponding second scan line 210b and the first scan line 210a respectively, as illustrated in FIG. 2D. In addition, a circuit diagram of the pixel array of FIG. 2D is illustrated in FIG. 6. Moreover, the first source electrode 312d of the first transistor 312 and the second source electrode 322d of the second transistor 322 in accordance with the present embodiment are connected to the same data line 220a of the data lines 220.

To be exact, as illustrated in FIG. 2A and FIG. 2B, the second conductive wire 214 is disposed between the first sub-pixel 310 and the second sub-pixel 320 of the same pixel 230 as well as between two adjacent pixels 230. The length of each of the first conductive wires 212 is substantially longer than or equal to the width of the first pixel electrode 314 (or the second pixel electrode 324), and the length of each of the second conductive wires 214 is substantially longer than or equal to the length of the first pixel electrode 314 (or the second pixel electrode 324). Furthermore, the data line 220a in accordance with the present embodiment substantially intersects the first scan line 210a and the second scan line 210b, wherein the first sub-pixel 310 and the second sub-pixel 320 connected to the same data line 220a are arranged on the two sides of the data line 220a, and the first sub-pixel 310 and the second sub-pixel 320 are substantially disposed in the same row. As for the pixels 230 aligned in the same row in accordance with the present embodiment, a portion of the pixels 230 in even number columns are connected to one of the scan line 210, a portion of the pixels 230 in odd number columns are connected to another scan line 210. In other words, the second sub-pixels 320 in the even number columns are electrically connected to the first scan line 210a, and the first sub-pixels 310 in the odd number columns are electrically connected to the second scan line 210b.

In addition, the first gate electrode 312b of the first transistor 312 is substantially connected to the second scan line 210b, and the second gate electrode 322b of the second transistor 322 is substantially connected to the first scan line 210a. For the pixels 230 aligned in the same row, the first transistors 312 and the second transistors 322 are disposed on the same side of the pixels 230 of the same row, and the first transistors 312 in each of the pixels 230 is the 180-degree inverse of the second transistors 322. Thereby, the shape of the first transistors 312 and the shape of the second transistors 322 are mirror images of each other with respect to the data line 220a. In other words, the first transistor 312 and the second transistor 322 described above have substantially the same layout, thereby the shape of the first channel layer 312a and the second channel layer 322a are the same, the direction of the first drain electrode 312 extending to the corresponding first pixel electrode 314 and the direction of the second drain electrode 322c extending to the corresponding second pixel electrode 324 are the same, and the shape of the first source electrode 312d and the shape of the second source electrode 322d are the same. Furthermore, the first pixel electrode 314 and the second pixel electrode 324 cover a portion of the second conductive wires 214, wherein the second pixel electrode 324 also covers a portion of the first branch 216 and a portion of the second branch 218 within the same pixel 230.

In addition, for the pixels 230 aligned in the same row in accordance with the present embodiment, a connection line connecting a center point of the first sub-pixel 310 and a center point of the second sub-pixel 320 is substantially a straight line. To be exact, for the pixels 230 that include the first sub-pixel 310 and the second sub-pixel 320, the first sub-pixels 310 in the odd number columns and the second sub-pixel 320 in the even number columns are not perfectly aligned. The connection line connecting the center points of the first sub-pixels 310 is T1, and the connection line connecting the center point of the second sub-pixels 320 is T2, wherein the degree of drifting S between T1 and T2 is substantially between 3% and 50% of the length of the first sub-pixel 310 or the second sub-pixel 320. Since the degree of drifting S is considered to be insignificant, the first sub-pixels 310 and the second sub-pixels 320 are substantially disposed on the same row.

It is to be noted that, in the present embodiment, the direction of first drain electrode 312c extending to the corresponding first pixel electrode 314 and the direction of the second drain electrode 322c extending to the corresponding second pixel electrode 324 are the same. Therefore, even when misalignment occurs during the fabrication process of different layers of the transistors (or misalignment due to the tolerance of the machine), the gate-drain parasitic capacitance Cgd variation would remain relatively steady, and the steady gate-drain parasitic capacitance Cgd variation described here means that the gate-drain parasitic capacitance Cgd in each of the pixels 230 in the pixel array 200a increase or decrease concurrently. As a result, the difference in brightness between two adjacent pixels 230 would be less pronounced, and when the pixel array 200a is applied in a display device (not illustrated in the figure), the overall display uniformity can be raised, avoiding the issue of uneven brightness caused by the flicker effect.

In addition, the pixel array 200a in accordance with the present embodiment is designed to arrange the scan lines 210 layout in a zigzag manner, and the first sub-pixel 310 and the second sub-pixel 320 connected to the same data line 220a are disposed on the two sides of the data line 220a. In addition, the first gate electrode 312b of the first transistor 312 of the pixel 230 is connected to the second scan line 210b, and the second gate electrode 322b of the second transistor 322 of the pixel 230 is connected to the first scan line 210a. The design not only greatly reduces the amount of data lines 220 in the layout, but also increases the aperture ratio so that the brightness of the display is improved. Furthermore, the pixels 230 in accordance with the present embodiment are substantially aligned in the same row, each of the pixels 230 formed by the first sub-pixel 310 and the second sub-pixel 320 is substantially rectangular in shape. In comparison with the conventional pixel array 100, the present embodiment can further increase the color performance of the display picture.

Figure 3A:
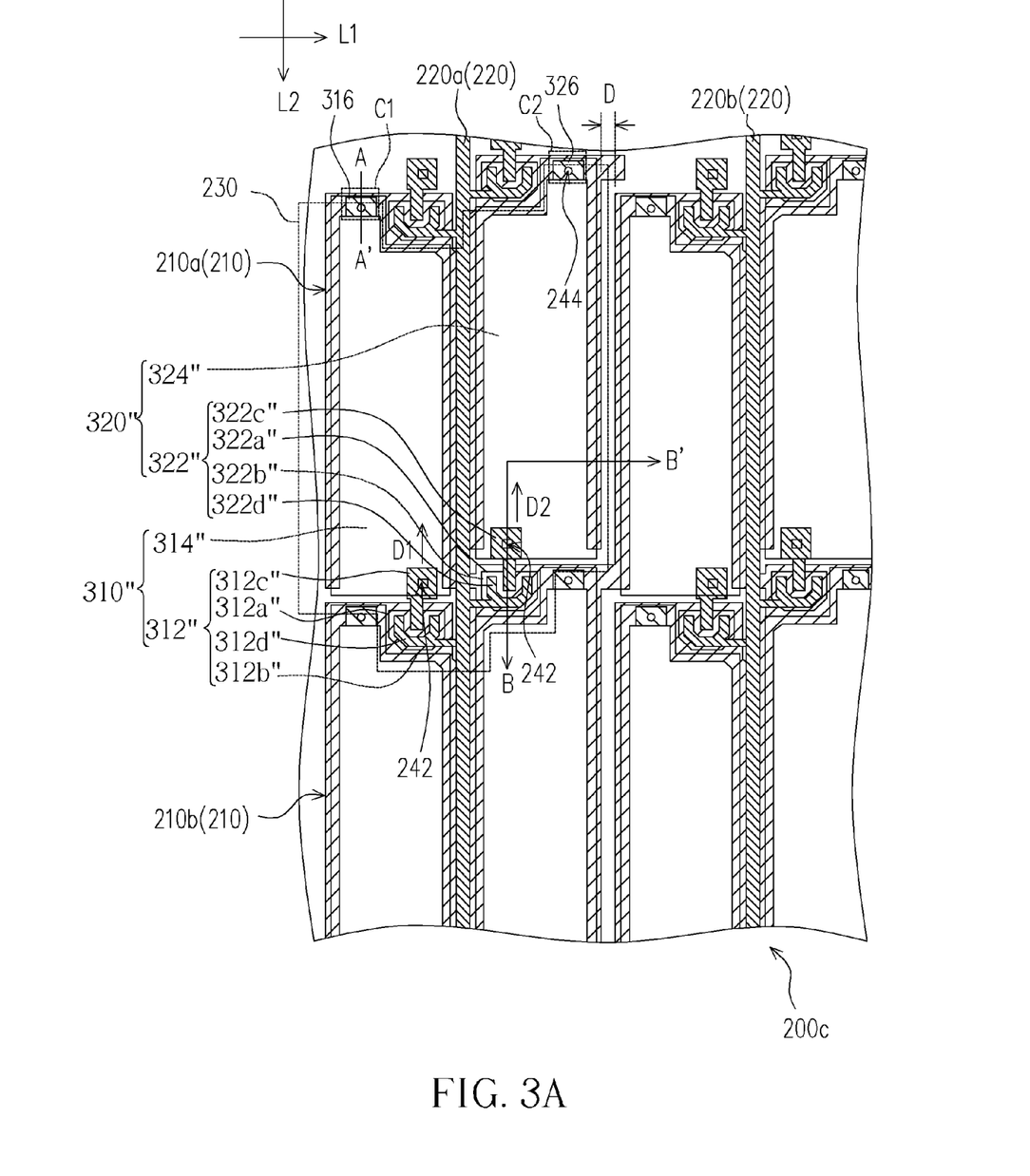
FIG. 3A is a schematic diagram illustrating a pixel array in accordance with an embodiment of the present invention.
Figure 3B:
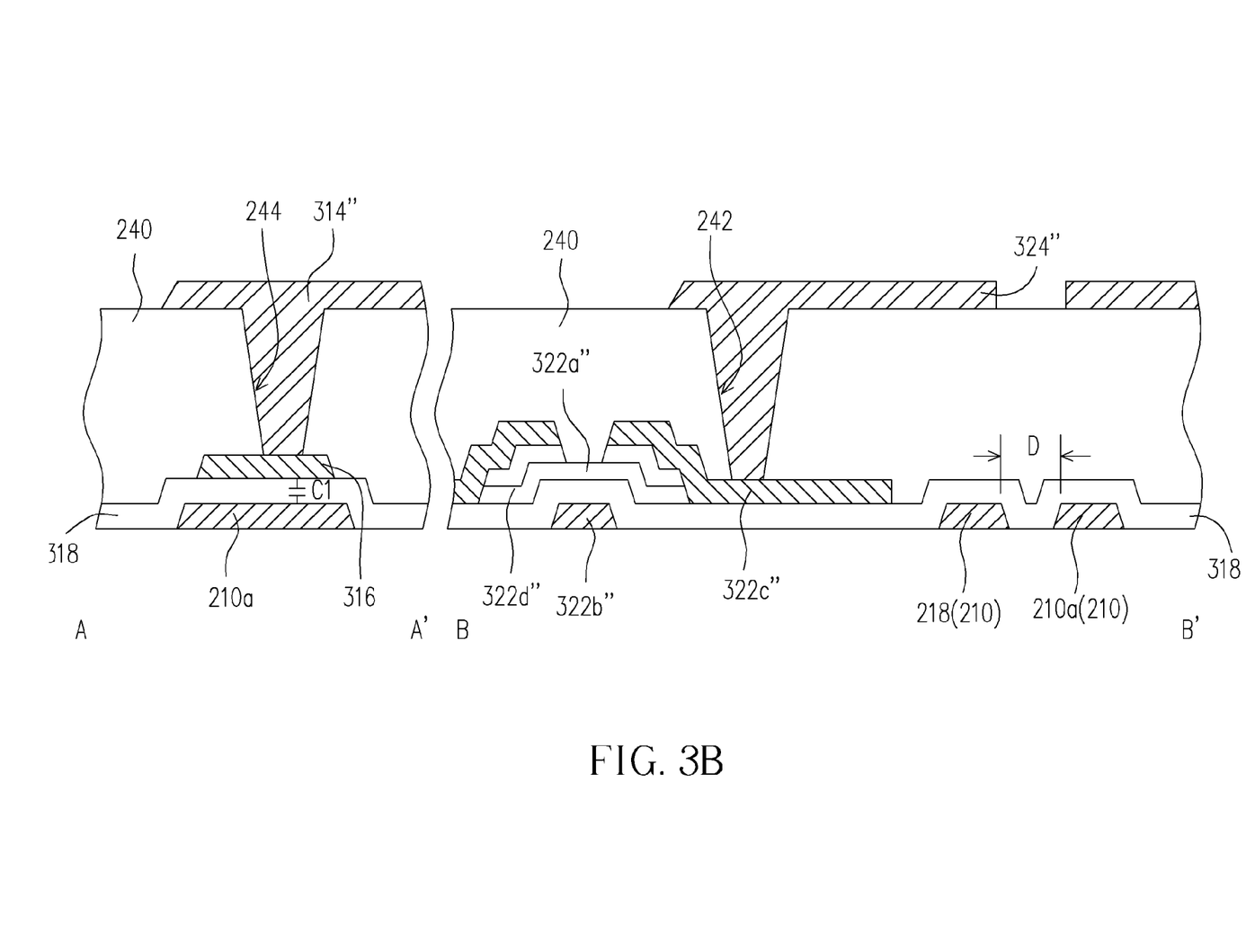
FIG. 3B is a schematic cross-sectional diagram of FIG. 3A along line A-A' and line B-B'.
Figure 3C:
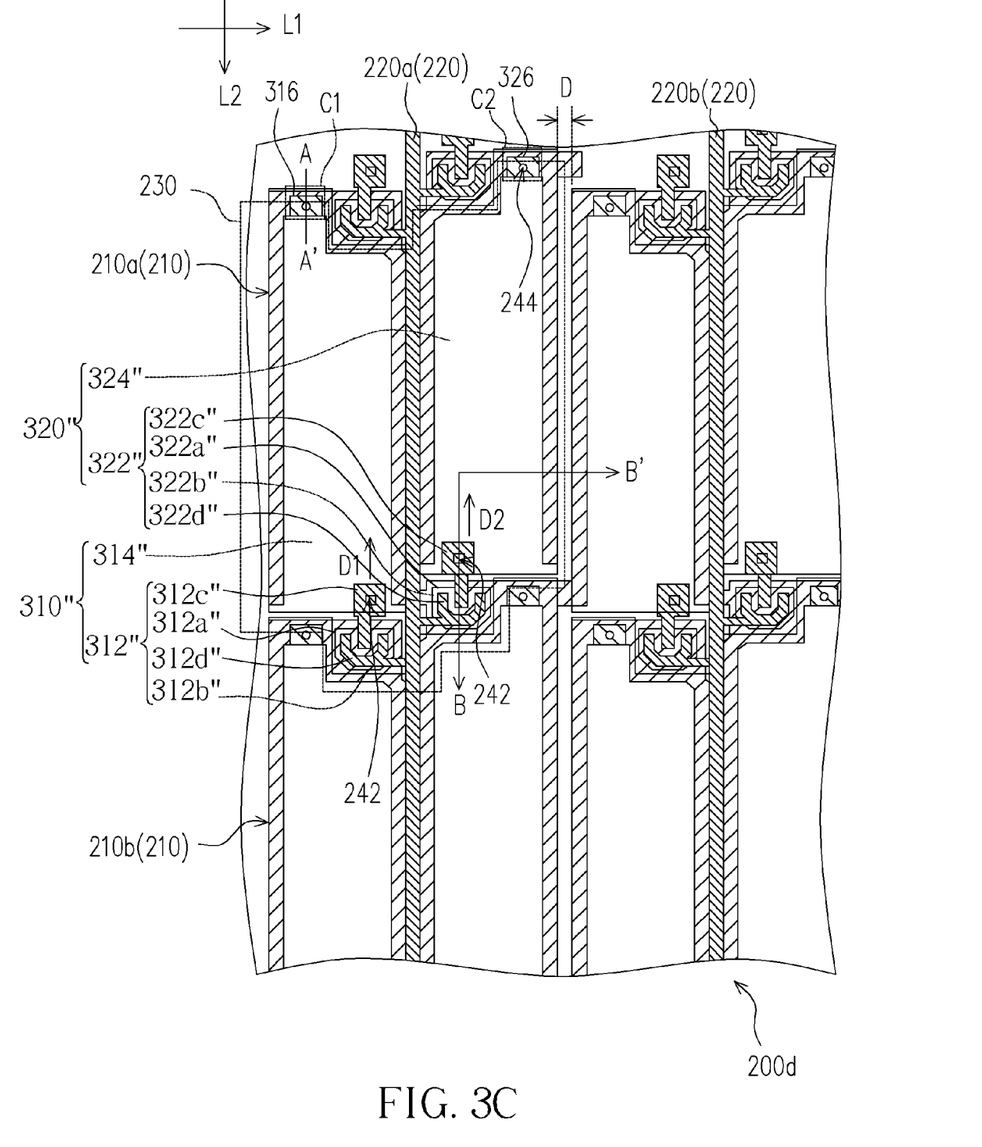
FIG. 3C is a schematic diagram illustrating a pixel array in accordance with another embodiment of the present invention.

FIG. 3A is a schematic diagram illustrating a pixel array in accordance with an embodiment of the present invention. FIG. 3B is a schematic cross-sectional diagram of FIG. 3A along line A-A' and line B-B'. Referring to FIG. 3A and FIG. 3B, a pixel array 200c in accordance with the present embodiment is similar to the pixel array 200a described above. However, the pixel array 200c in accordance with the present embodiment reduces a gap D between adjacent pixels such that within the same layout area, the pixel area increases as the gap D between the adjacent pixels decreases and the aperture ratio is therefore increased. In addition, in the pixel array 200c of high aperture ratio in accordance with the present embodiment, a dielectric layer 240 of a high coverage characteristic further covers the first transistor 312" and the second transistor 322". The dielectric layer 240 can be regarded as an overcoating layer. Therefore, the layout pattern of the first pixel electrode 314" and the second pixel electrode 324" can further extend to overlie the corresponding scan lines 210, and the aperture ratio of the pixels is further improved. It is to be noted that, in the illustration of the present embodiment, the first pixel electrode 314" and the second pixel electrode 324" only cover a portion of the $n^{th}$ scan line and the $(n+1)^{th}$ scan line. However, in other embodiments, referring to FIG. 3C, a first pixel electrode 314''' and a second pixel electrode 324''' can also cover the entire surroundings of the first sub-pixel 310''' and the second sub-pixel 320'''.

In order to further increase the storage capacitance of the first sub-pixel 310" and the second sub-pixel 320", the first sub-pixel 310" further includes a first capacitor electrode 316, and the second sub-pixel 320" further include a second capacitor electrode 326. To be exact, the first capacitor electrode 316 is electrically connected to the first pixel electrode 314", and the first capacitor electrode 316 partially overlaps a previous scan line 210 (i.e. the $n^{th}$ scan line 210) to form a first storage capacitor C1; the second capacitor electrode 326 is electrically connected to the second pixel electrode 324", and the second capacitor electrode 326 partially overlaps a previous scan line 210 (i.e. the $(n-1)^{th}$ scan line 210) to form a second storage capacitor C2.

To be exact, continue referring to FIG. 3A and FIG. 3B, in the first sub-pixel 310" in the n$^{th}$ row, the first pixel electrode 314" is electrically connected to the first transistor 312" through a first contact via 242 of the dielectric layer 240, and the first pixel electrode 314" is electrically connected to the first capacitor electrode 316 through a second contact via 244 of the dielectric layer 240. In actual operating procedures, an "On" voltage level is applied to the (n+1)$^{th}$ scan line 210 (i.e. the second scan line 210b) to turn on the first transistor 312", then a data voltage is charged from the data line 220a and the data voltage is transferred to the first pixel electrode 314" through the turned-on first transistor 312" and the first contact via 242 of the dielectric layer 240. In addition, the first pixel electrode 314" having the data voltage transfers the data voltage to the first capacitor electrode 316 through the second contact via 244 of the dielectric layer 240, so that the first pixel electrode 314" and the first capacitor electrode 316 would have the same voltage level. Therefore, the (n+1)$^{th}$ scan line 210 (i.e. the second scan line 210b), the first capacitor electrode 316 and a gate insulation layer 318 between the (n+1)$^{th}$ scan line 210 (i.e. the second scan line 210b) and the first capacitor electrode 316 form the first storage capacitor C1 of the first sub-pixel 310". The first storage capacitor C1 stabilizes the data voltage of the first pixel electrode 314" while the first transistor 312" is turned off, improving the display quality. As a result, the first sub-pixel 310" can have both the high aperture ratio and high storage capacitance. Similarly, the operating procedure of the second sub-pixel 320" is similar to that of the first sub-pixel 310" and it is therefore not redundantly described.

In summary, the pixel array in accordance with the present invention is designed to arrange the scan lines in a zigzag manner, and to dispose the first sub-pixel and the second sub-pixel connected to the same data line on two sides of the data line. Meanwhile, the first gate electrode of the first transistor in the same pixel is connected to the (n+1)$^{th}$ scan line, and the second gate electrode of the second transistor is connected to the n$^{th}$ scan line. Therefore, the design of the pixel array in accordance with the present invention not only reduces the amount of data lines in the layout pattern significantly to effectively increase the aperture ratio and improve the brightness of the display, but also improves the color performance of the display device. In addition, since the directions of the drain electrodes of the transistors extending toward the corresponding pixel electrodes are the same, when misalignment occurs during the fabrication of the thin films of the transistors, the gate-drain parasitic capacitance Cgd in the overall pixel would impose a small variance. As a result, when the pixel array in accordance with the present invention is applied to a display device, the display uniformity of the display device can be improved, i.e. the issue of uneven brightness caused by the flicker effect can be avoided.

Those skilled in the art will readily observe that numerous modifications and alterations of the device and method may be made while retaining the teachings of the invention.

What is claimed is:

1. A pixel array, comprising:
   a plurality of scan lines extending along a row direction in a zigzag manner;
   a plurality of data lines extending along a column direction and intersecting with the scan lines;
   a plurality of pixels connected to the scan lines and the data lines, each of the pixels aligned in an n$^{th}$ row comprising:
      a first sub-pixel comprising a first transistor and a first pixel electrode, wherein a first gate electrode of the first transistor is connected to an (n+1)th scan line and a first drain electrode of the first transistor is connected to the first pixel electrode; and
      a second sub-pixel comprising a second transistor and a second pixel electrode, wherein a second gate electrode of the second transistor is connected with an n$^{th}$ scan line, a second drain electrode of the second transistor is connected to the second pixel electrode, and a first source electrode of the first transistor and a second source electrode of the second transistor are connected to a same data line of the data lines
   wherein three sides of each of the first pixel electrodes or three sides of each of the second pixel electrodes are surrounded by a corresponding scan line.

2. The pixel array of claim 1, wherein a layout pattern of the first transistor and a layout pattern of the second transistor have an upward protrusive pattern with respect to a corresponding scan line.

3. The pixel array of claim 1, wherein a layout pattern of the first transistor and a layout pattern of the second transistor have a downward protrusive pattern with respect to a corresponding scan line.

4. The pixel array of claim 1, wherein the first transistors and the second transistors of the pixels aligned in a same row are disposed on a same side of the row of the pixels.

5. The pixel array of claim 1, wherein each of the scan lines is a square shaped wave pattern on the pixel array.

6. The pixel array of claim 1, wherein each of the scan lines comprises:
   a plurality of first conductive wires extending along the row direction; and
   a plurality of second conductive wires extending along the column direction;
   wherein the first conductive wires and the second conductive wires are alternately connected.

7. The pixel array of claim 6, wherein a portion of the second conductive wires is covered by either the first pixel electrode or the second pixel electrode.

8. The pixel array of claim 6, wherein the second conductive wires are disposed between the first sub-pixel and the second sub-pixel of a same pixel and disposed between two adjacent pixels.

9. The pixel array of claim 6, wherein a length of each of the first conductive wires is substantially longer than or equal to a width of one of the pixel electrodes, and a length of each of the second conductive wires is substantially longer than or equal to a length of one of the pixel electrodes.

10. The pixel array of claim 6, wherein each of the scan lines further comprises:
   a plurality of first branches connected to a portion of the first conductive wires and extending along the column direction; and
   a plurality of second branches connected to a portion of the first conductive wires and extending along the column direction;
   wherein the first branches and the second branches are substantially parallel to the second conductive wires.

11. The pixel array of claim 10, wherein a portion of the first branches and a portion of the second branches disposed in a same pixel are covered by the second pixel electrode.

12. The pixel array of claim 1, wherein the pixels connected to a same data line are arranged on two sides of the data line.

13. The pixel array of claim 1, wherein in the pixels aligned in a same row, a portion of the pixels in even number columns are connected to a same scan line, and a portion of the pixels in odd number columns are connected to another scan line.

14. The pixel array of claim 1, wherein in each of the pixels aligned in an n$^{th}$ row, the first transistor and the second transistor comprise a first channel layer and a second channel layer respectively, the first channel layer is disposed above the $(n+1)^{th}$ scan line, the second channel layer is disposed above the $n^{th}$ scan line, the first drain electrode is connected to the first pixel electrode from the first channel layer along a first direction, the second drain electrode is connected to the second pixel electrode from the second channel layer along a second direction, and the first direction is the same as the second direction.

15. The pixel array of claim 1, wherein in the pixels aligned in a same row, a connection line connecting a center point of the first sub-pixel and a center point of the second sub-pixel is substantially a straight line.

16. The pixel array of claim 1, wherein in each of the pixels, a shape of the first transistor and a shape of the second transistor are mirror images of each other with respect to the data line.

17. The pixel array of claim 1, wherein the first sub-pixel further comprises a first capacitor electrode electrically connected to the first pixel electrode, the first capacitor electrode partially overlaps a previous scan line to form a first storage capacitor, the second sub-pixel further comprises a second capacitor electrode electrically connected to the second pixel electrode, and the second capacitor electrode partially overlaps the previous scan line to form a second storage capacitor.

* * * * *